United States Patent [19]
Van Patten

[11] 3,835,702
[45] Sept. 17, 1974

[54] MULTI-AXIS BIO-MECHANICAL FORCE MEASURING DEVICE

[75] Inventor: Robert E. Van Patten, Kettering, Ohio

[73] Assignee: The United States of America as represented by the Secretary of the Air Force, Washington, D.C.

[22] Filed: Sept. 13, 1973

[21] Appl. No.: 396,967

[52] U.S. Cl. .................. 73/133 R, 244/83 E, 338/5
[51] Int. Cl. ............................................. G01l 5/22
[58] Field of Search .............. 73/133 R, 147; 338/5; 244/83 E

[56] References Cited
UNITED STATES PATENTS

| | | | |
|---|---|---|---|
| 2,782,636 | 2/1957 | Peucker | 73/147 X |
| 3,304,799 | 2/1967 | Menefee | 73/133 R |
| 3,473,760 | 10/1969 | Vaiden | 244/83 E |
| 3,620,073 | 11/1971 | Robbins | 73/133 R |
| 3,729,990 | 5/1973 | Oliver | 73/133 R |

FOREIGN PATENTS OR APPLICATIONS

| | | | |
|---|---|---|---|
| 152,774 | 2/1963 | U.S.S.R. | 73/133 R |

Primary Examiner—Charles A. Ruehl
Attorney, Agent, or Firm—Harry A. Herbert, Jr.; Arthur R. Parker

[57] ABSTRACT

A hand grip device positionable on an aircraft control stick and having built-in force-measuring means for separating and measuring various force vectors being developed while maneuvering the aircraft into various positions and including an upper housing rigidly mounting therewithin a tension/compression-force measuring diaphragm unit and the upper end portion of a bending moment-measuring column member affixed to the diaphragm unit, and a lower housing mounting the lower end portion of the column member in constraining bearing elements and a torsion gage assembly having a spindle with an upper end fixed within the column member-lower end and a lower end thrust bearing mounted in the lower housing.

9 Claims, 1 Drawing Figure

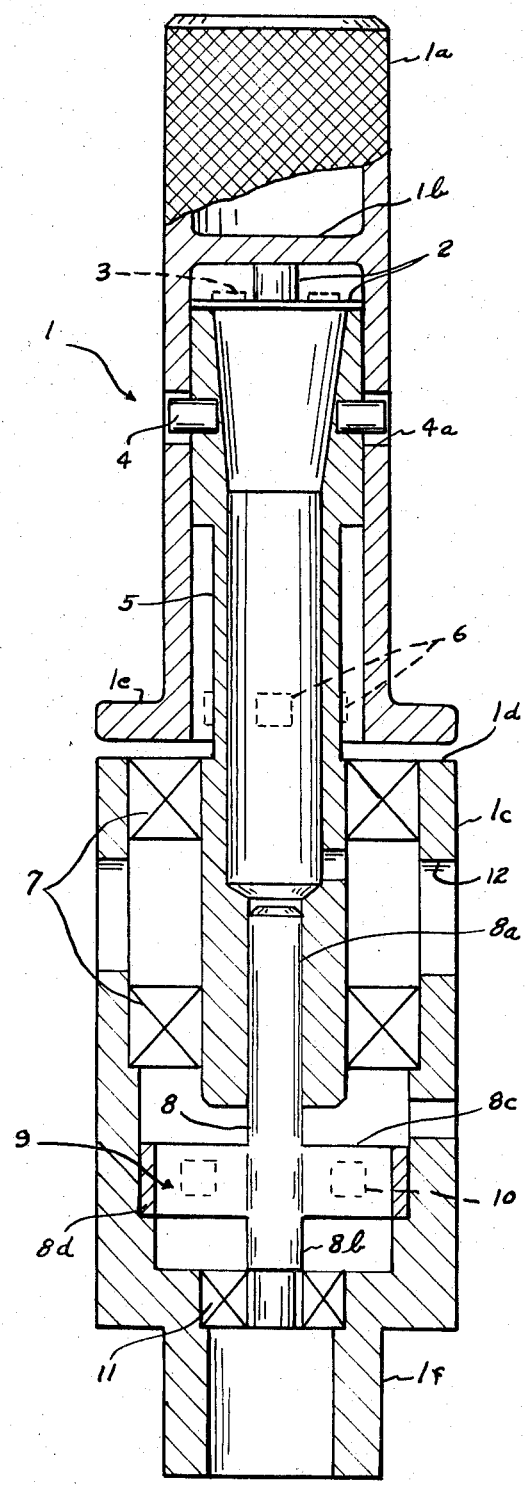

MULTI-AXIS BIO-MECHANICAL FORCE MEASURING DEVICE

BACKGROUND OF THE INVENTION

This invention relates generally to a hand grip device that is specifically adapted to separate and measure certain vectors representing various forces being manually exerted about a plurality of axes and in rotation by an aircraft pilot through the maneuver of an aircraft by the use of a control stick.

In the investigation of the bio-mechanical problems involved in the design of aircraft controls, it is essential or, at least, highly desirable that certain pertinent data be obtained regarding the manual loads required to be applied by the pilot to the control stick of a particular design aircraft in order to effectively and relatively easily maneuver the aircraft. Unfortunately, this data, which more particularly involves the determination of certain force vectors, has heretofore been unavailable. However, with the new and novel hand grip device of the present invention, to be described hereinafter in the following summary and detailed description, the various component stresses occurring during the operation of the aircraft-control stick are uniquely separated and individually measured by a novel combination of force-measuring elements that have been contained within a shape and volume small enough to be gripped comfortably in the human hand.

SUMMARY OF THE INVENTION

The present invention constitutes a hollow hand grip device that may be positioned over the upper end of an aircraft-control stick and used to move the said control stick and accurately separate and measure certain loads being exerted on said control stick during its use to maneuver a particular aircraft. For this purpose, the inventive hand grip device consists principally of a hollow, upper housing in which are rigidly mounted a tension and compression diaphragm unit and strain gage assembly and the upper end portion of a strain gage-mounted, bending moment column; and a hollow, lower housing that is somewhat separated from, and thereby provides for the relative movement therewith of the upper housing, and which is further directly mounted on the control stick and, in turn, mounts both the lower end portion of the bending moment column through the use of constraining ball bearings, and a torsion gage assembly that includes a spindle having an upper end fixed within the bending moment column and a lower end thereof that is thrust bearing mounted within the lower housing. Means are provided between the bending moment column and the upper housing to allow a slight longitudinal movement thereof, as the tension/compression unit is stressed while, simultaneously therewith, preventing any rotary movement applied to the grip from being transmitted to the said tension/compression unit.

Other objects and advantages of the invention will become readily apparent hereinafter from the following disclosure and accompanying claims, in which the SINGLE VIEW of the drawing represents a longitudinal sectional view, partly schematic and broken away, of the novel hand grip device of the present invention.

DESCRIPTION OF THE PREFERRED EMBODIMENT

Referring to the single FIGURE of the drawing, the present hand grip device is indicated generally at 1 as including a relatively narrow, hollow and open bottom, knurled upper housing 1a within which is mounted a combined tension and compression diaphragm assembly 2 and the upper end portion of a hollow and relatively elongated, bending moment column member 5; and a relatively enlarged, hollow open top lower housing 1c which mounts therewithin the lower end portion of the bending moment column member 5 and a torsion gage assembly 9 that includes an integral and relatively elongated, torsion gage assembly-spindle member 8 having an upper end portion 8a that may be suitably clamped in snug-fit relation by any well-known means within an elongated passage appropriately formed therefor, as is clearly illustrated, in the lower end portion of the column member 5. For this purpose, set screws (not shown) may be installed through cut-outs, as at 12, in the lower housing 1c, which cut-outs also serve to allow for connecting the many strain gage lead lines to external terminals (also not shown). The spindle member 8 terminates in a lower end portion 8b that is rigidly supported within the lower housing 1c by a thrust bearing 11. Lower housing 1c terminates in a reduced diameter-lower end, indicated generally at 1f, which constitutes the actual portion of the inventive hand grip device 1 that is adapted to be fitted over the upper end of an aircraft-control stick, the latter, however, not being shown.

The above-noted tension/compression diaphragm assembly 2, which is rigidly fastened within the interior or hollow portion of the upper housing 1a to a bulkhead at 1b, is equipped with strain gages of a suitable, conventional design, as indicated schematically and generally at 3, which will provide signals proportional to any longitudinal, up-or-down, or coaxial forces being manually applied to the outside circumference of the inventive hand grip device-upper housing 1a, the latter element constituting the actual hand-gripping portion of the invention. Of course, to specifically provide for the manual transmission of various hand-applied loads to the upper housing 1a to either the tension/compression diaphragm assembly 2, the bending moment column member 5 and/or the torsion gage assembly 9, or to all of them, the lower housing 1c is specifically positioned or oriented with an open top surface 1d disposed in spaced relation from the open bottom surface 1e. The latter is actually expanded, as is clearly illustrated, into a flange-like bottom surface of a size equal to the outside diameter of the said lower housing-top surface 1d.

The upper end portion of the bending moment column member 5 is equipped with two, oppositely disposed restraining pins 4 by virtue of tapped holes in its periphery, which restraining pins 4 are installed through relatively short, longitudinal slots 4a formed at the appropriate locations in the circumference of the upper housing 1a, after the latter element has been installed on the tension/compression diaphragm assembly 2 through the previously described rigid fastening thereof with the bulkhead 1b. It is the function of these pins 4 and the longitudinal slots 4a to allow a slight free motion of the grip device 1, as the aforesaid tension/compression diaphragm assembly 2, and, of course, the bending moment column member 5 attached thereto, are stressed by the application of a hand-gripping load or loads to the upper housing 1a. This pin and slot arrangement prevents any rotary motion from being applied to the said tension/compression diaphragm assembly 2, as was noted hereinbefore.

The bending moment column member 5 performs its requisite measuring function, when any bending loads are applied to the present hand grip device 1 by means of a set of conventional strain gages designed for this purpose and located near the bottom thereof, as is indicated schematically and generally at the reference number 6, of the active portion of the said column member 5. These gages total four in number so as to provide both for bridge temperature compensation and to permit stresses applied in bending to the hand grip device-upper housing 1a to be resolved into their vector components and so separately measured.

The lower end portion of the said bending moment column member 5, which extends through the open bottom surface 1e of the upper housing 1a into and through the open upper surface 1d of the lower housing 1c, is uniquely carried in and constrained by two, spaced-apart ball bearings, at 7, in order to allow any torsional moments about the centerline or longitudinal axis of the device 1, that have been created by the appropriate loads being applied to the upper housing 1a, to be freely transmitted to the previously referred to torsion gage assembly 9, by virtue of the fixed attachment of the torsion gage-spindle member 8 thereof within the lower end portion of the bending moment column member 5, and thus to allow the torsion sensing strain gages, shown installed in schematic form at 10, to develope signals proportional to the torsional stress. In this connection, it is noted that with regard to the previously-described lower end portion 8b of the torsion-spindle member 8 being supported in the thrust bearing 11, this novel arrangement ensures the relief of the torsion gage assembly-beams, at 8 c, of loads at 90° to the beam bending axes. In this regard, the present torsion gage assembly 9 preferably has the appearance of a cruiciform and torus in plan view and thus the aforesaid torsion-strain gages 10 are actually beam bending gages that are respectively mounted in the torsion gage assembly beams, as at 8c. The outer torus, at 8d, of the said torsion gage assembly 9 would, of course, be restrained from rotating relative to the lower housing 1c.

Thus, a new and novel force-measuring mechanism has been developed by the present invention by which the individual component stresses occurring during the manipulation of an aircraft-control stick to thereby operate various aircraft controls may be rather easily separated and measured by a unique hand grip device that is small enough to be comfortably accommodated in the human hand and which incorporates separate but coordinated assemblies for measuring tension, compression, torsion and bending moments being manually applied by a human operator.

The present invention also specifically allows the section moduli of the tension/compression, bending moment and torsion sensing assemblies thereof to be designed to expressly provide for the wide dynamic range of forces which can be developed in various directions during the manipulation of the control stick and the present hand grip device mounted thereon. Thus, there is avoided the usual necessity of resorting to non-linear but high output gages associated with very high gain amplifiers which would normally be required if, for example, the bending moment column member 5 carried both the tension/compression and torsion gages, as well, instead of there actually being a separate assembly for each, as in the subject invention. In other words, the unique instrument of the present invention enables the separate detection of hand-applied forces along three orthogonal axes, as well as rotations about the vertical axis.

I claim:

1. A hand grip device mountable on, and incorporating built-in force-responsive means for separating and accurately measuring the individual component stresses occurring during the operation of a control stick to actuate various aircraft controls; said built-in force-responsive means being contained within and comprising; first enclosure means having an exterior hand-gripping surface portion and rigidly mounting therewithin a first, force-measuring means disposed in transverse relation, and automatically responsive to measure forces being manually applied to said hand-gripping surface portion along a first, longitudinal and-/or coaxially-disposed axis, and further mounting the upper end portion of a second, force-measuring means disposed along and oriented in alignment with the longitudinal axis; and second enclosure means communicating with and separated from said first enclosure means to provide for relative movement therebetween about several axes, and mounting both the lower end portion of said second, force-measuring means through an intermediately disposed constraining means for thereby automatically measuring forces being manually applied to the said hand-gripping surface portion along either of two axes orthogonal to each other and to said first-named axis, and third, force-measuring means having an elongated element portion aligned with the said longitudinal axis and being rigidly mounted between said second enclosure means and the lower end portion of said second, force-measuring means and a transversely extending portion extending between and in rigid contact with opposite sides of the inside diameter surface of said second enclosure means, and further equipped with oppositely-disposed, force-measuring elements automatically responsive to measure rotational forces being manually applied to said hand-gripping surface portion about the longitudinal axis in either direction.

2. A hand grip device in claim 1, wherein said first, force-measuring means comprises a strain gage-mounted tension/compression diaphragm unit rigidly fastened to a bulkhead element interiorily-disposed in said first enclosure means.

3. A hand grip device as in claim 2, wherein said second, force-measuring means comprises an elongated bending moment column member having the said upper end portion thereof affixed to the bottom of said diaphragm unit.

4. A hand grip device as in claim 3, said bending moment column member-upper end portion incorporating a pair of oppositely disposed restraining means respectively engaged in a pair of relatively short corresponding slots formed in the periphery of said first enclosure means for thereby collectively allowing both a limited movement of said first enclosure means and the said column member in the longitudinal direction, as the said tension/compression diaphragm unit is stressed by the application of manual pressure on the said hand-gripping surface portion and, simultaneously therewith, completely preventing any rotary motion from being imparted to said tension/compression diaphragm unit.

5. A hand grip device as in claim 3, wherein said intermediately-disposed constraining means for the lower end portion of said bending moment column member comprises ball bearing elements dividing said member into an upper active portion and a lower, constrained or inactive portion.

6. A hand grip device as in claim 5, said bending moment column member incorporating a plurality of four strain gages equally spaced therearound and located adjacent or nearly adjacent to the bottom of the active portion thereof within the said first enclosure means for thereby providing both for bridge temperature compensation and the resolution of stresses being applied thereto in bending into their vector components.

7. A hand grip device as in claim 6, wherein said third-named, force-measuring means comprises a torsion gage assembly.

8. A hand grip device as in claim 7, wherein said torsion gage assembly comprises a spindle member constituting the said elongated element portion and having an upper end extending into and fixed within a portion of the lower end portion of said bending moment column member and a lower end fixed within a thrust bearing positioned within, or adjacent the bottom portion of said second enclosure means.

9. A hand grip device as in claim 8, wherein said torsion gage assembly further comprises a combined cruciform-and-torus-shaped member forming a pair of oppositely-disposed and beam bending-mounted, torsion gages operative to automatically and separately measure rotational forces being respectively applied in opposite directions to the hand-gripping surface portion of said first enclosure means.

* * * * *